(12) United States Patent
White et al.

(10) Patent No.: US 7,393,876 B2
(45) Date of Patent: Jul. 1, 2008

(54) FISCHER-TROPSCH CATALYSTS

(75) Inventors: James H. White, Boulder, CO (US); Jesse W. Taylor, Westminster, CO (US)

(73) Assignee: Eltron Research, Inc., Boulder, CO (US)

( * ) Notice: Subject to any disclaimer, the term of this patent is extended or adjusted under 35 U.S.C. 154(b) by 2 days.

(21) Appl. No.: 11/303,451

(22) Filed: Dec. 16, 2005

(65) Prior Publication Data

US 2007/0142483 A1  Jun. 21, 2007

(51) Int. Cl.
    *C07C 27/00*  (2006.01)
(52) U.S. Cl. ............... 518/715; 518/713; 518/714; 518/717; 518/719; 518/721
(58) Field of Classification Search ......... 518/713–715, 518/717, 719, 721
    See application file for complete search history.

(56) References Cited

U.S. PATENT DOCUMENTS

| | | | |
|---|---|---|---|
| 4,151,190 A | 4/1979 | Murchison et al. |
| 4,451,579 A | 5/1984 | Lemanski et al. |
| 4,518,707 A | 5/1985 | Soled et al. |
| 4,537,867 A | 8/1985 | Fiato et al. |
| 4,544,671 A | 10/1985 | Soled et al. |
| 4,544,672 A | 10/1985 | Fiato et al. |
| 4,544,673 A | 10/1985 | Lemanski et al. |
| 4,544,674 A | 10/1985 | Fiato et al. |
| 4,584,323 A | 4/1986 | Soled et al. |
| 4,585,798 A | 4/1986 | Beuther et al. |
| 4,595,703 A | 6/1986 | Payne et al. |
| 4,607,020 A | 8/1986 | Soled et al. |
| 4,618,597 A | 10/1986 | Fiato et al. |
| 4,621,102 A | 11/1986 | Fiato et al. |
| 4,738,948 A | 4/1988 | Iglesia et al. |
| 4,788,222 A | 11/1988 | Rice et al. |
| 4,794,099 A | 12/1988 | Iglesia et al. |
| 4,822,824 A | 4/1989 | Iglesia et al. |
| 4,861,802 A | 8/1989 | McCann |
| 4,960,801 A | 10/1990 | Iglesia et al. |
| 5,036,032 A | 7/1991 | Iglesia et al. |
| 5,100,856 A | 3/1992 | Soled et al. |
| 5,118,715 A | 6/1992 | Iglesia et al. |
| 5,140,050 A | 8/1992 | Mauldin et al. |
| 5,145,876 A | 9/1992 | Shutt |
| 5,162,284 A | 11/1992 | Soled et al. |
| 5,169,821 A | 12/1992 | Soled et al. |
| 5,185,378 A | 2/1993 | Soled et al. |
| 5,248,701 A | 9/1993 | Soled et al. |
| 5,292,705 A | 3/1994 | Mitchell |
| 5,389,690 A | 2/1995 | Mitchell |
| 5,728,918 A | 3/1998 | Nay et al. |
| 5,856,365 A | 1/1999 | Zennaro et al. |
| 5,939,350 A | 8/1999 | Singleton et al. |
| 6,100,304 A | 8/2000 | Singleton et al. |
| 6,191,066 B1 | 2/2001 | Singleton et al. |
| 6,262,132 B1 | 7/2001 | Singleton et al. |
| 6,271,432 B2 | 8/2001 | Singleton et al. |
| 6,313,062 B1 | 11/2001 | Krylova et al. |
| 6,515,035 B2 | 2/2003 | Roy-Auberger et al. |
| 6,537,945 B2 | 3/2003 | Singleton et al. |
| 6,602,921 B2 | 8/2003 | Manzer et al. |
| 6,652,738 B2 | 11/2003 | Eijsbouts et al. |

OTHER PUBLICATIONS

Goldwasser et al. (2003) "Modified Iron Perovskites as Catalysts Precursors for the Conversion of Syngas Molecular Weight Alkenes," *J. Mol. Catalysis A: Chemical* 193:227-236.
Moser et al. (1996) *Advanced Catalysts and Nanostructured Materials; Modern Synthetic Methods*, Moser, ed., Academic, San Diego, CA, p. 535-562.
O'Brien et al. (1996) "Activation Study of Precipitated Iron Fischer-Tropsch Catalysts," *Energy and Fuels* 10:921-926.
Satterfield, C.N. (1991) "Fischer-Tropsch Synthesis," In; *Heterogeneous Catalysis in Industrial Practice*, McGraw-Hill, New York, p. 432-443.
Schubert et al. (2001) "Expanding Markets for GTL Fuels and Specialty Products, "In; *Studies in Surface Science and Catalysis 136: Natural Gas Conversion VI*, Iglesia et al. eds., Elsevier, Amsterdam, p. 459-464.
Sie et al. (1999) *Appl. Catalysis A: General* 186: 55-.

*Primary Examiner*—J. Parsa
(74) *Attorney, Agent, or Firm*—Greenlee, Winner and Sullivan, P.C.

(57) ABSTRACT

Catalyst compositions and methods for F-T synthesis which exhibit high CO conversion with minor levels (preferably less than 35% and more preferably less than 5%) or no measurable carbon dioxide generation. F-T active catalysts are prepared by reduction of certain oxygen deficient mixed metal oxides.

23 Claims, No Drawings

FISCHER-TROPSCH CATALYSTS

STATEMENT REGARDING U.S. GOVERNMENT SUPPORT

This invention was funded under NASA SBIR contract NNM04AA78C. The United States government has certain rights in this invention.

BACKGROUND OF THE INVENTION

Fischer-Tropsch (F-T) synthesis involves the catalytic reductive oligomerization of carbon monoxide in the presence of hydrogen as follows:

$$n\,CO + 2n\,H_2 \rightleftharpoons (CH_2)_n + n\,H_2O$$

where n is an integer and $(CH_2)_n$ represents hydrocarbons (paraffinic and olefinic), with an enthalpy of reaction of −165 kJ/mole (P. F. Schubert et al. (2001) "Studies in Surface Science and Catalysis 136: natural Gas Conversion VI,". E. Iglesia et al. (eds.) Elsevier, Amsterdam p 459.) Generally, the process converts a mixture of CO and molecular hydrogen into a mixture of hydrocarbons, including saturated hydrocarbons and olefins. Oxygenated hydrocarbons, such as alcohols, and sometimes aromatics may also be formed in a F-T process. More specifically, products of F-T processes can include gaseous, liquid, heavy oil, and wax products which can be further upgraded to various fuels (gasoline, jet fuel, diesel fuel, etc.) and other value-added hydrocarbon products, particularly liquid hydrocarbons.

A mixture of CO and hydrogen for the F-T process can be generated in a number of ways, and in particular can be synthesis gas "syngas." Syngas is available from a variety of sources and can, for example, be prepared by coal, biomass, or waste gasification processes or can be produced from methane, for example by steam reforming or partial oxidation. The ratio of $H_2$ to CO in syngas from a given source may vary significantly (e.g., from about 0.3 up to 3 or higher) and a given F-T catalyst may be sensitive to that ratio (i.e., exhibit increased or decreased activity or changes in selectivity dependent upon that ratio.)

While a number of metals demonstrate F-T activity, only four metals: Fe, Co, Ru, and Ni are regarded in the art as usefully active. The utility of F-T catalysts is decreased if they exhibit high methanation activity. High levels of catalytic methane formation from CO and hydrogen by a catalyst as in the reaction:

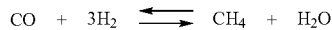

$$CO + 3H_2 \rightleftharpoons CH_4 + H_2O$$

decreases the utility of that catalyst for formation of higher hydrocarbons. For example, the utility of Ni on conventional metal oxide supports as an F-T catalyst is decreased by its high methanation activity. In contrast, Ni supported on some molecular sieves such as zeolite Y does not exhibit high methanation activity making it a more useful F-T catalyst.

The mechanism of the F-T catalytic reaction is dependent upon the catalyst employed. Some metals may dissociatively adsorb CO and others associatively adsorb this molecule. The tendency for dissociative adsorption increases on going from right to left on the Periodic Table. For example, iron dissociatively chemisorbs CO and, as a consequence, the active phase of the catalyst is not metal, but is generally regarded as a metal carbide phase (C. N. Satterfield (1991) "Heterogeneous Catalysis in Industrial Practice," McGraw-Hill, New York p. 432.) In contrast, cobalt associatively adsorbs CO, with hydrogenation of the adsorbed CO to $CH_x$ fragments. The olefin reabsorption and CO hydrogenation models have been used to describe the F-T system and explain many of the features that have been observed. (E. Iglesia et al. (1993) in "Computer Aided Design of Catalysts," E. R. Becker, et al. (eds) Marcel Dekker, New York p. 199.)

Features of established catalytic systems for F-T synthesis are summarized hereafter. Iron and cobalt-based systems have generally received more attention and certain of these systems have been commercialized. Iron and cobalt based systems have their origins with Fischer and Tropsch who developed alkalized iron turning- and Kieselguhr-supported cobalt/magnesia (or thoria) catalysts (See: F. Fischer and H. Tropsch (1923) Brennst. Chem. 4:276 and F. Fischer and H. Tropsch (1925) German Patent 484,337) Iron-based and cobalt-based catalysts each have advantages for use in appropriate circumstances. Iron-based catalysts are typically employed, for example, where $H_2$:CO ratios are low (e.g., 0.5 to 1.5) as might be found in coal or biomass systems. In contrast, cobalt-based catalysts are more appropriately employed when $H_2$:CO ratios are high (>1.5) which would typically be found in natural gas-to-hydrocarbon liquids applications.

Advantages of iron-based catalyst are generally lower cost, relative insensitivity to reaction conditions, such as $H_2$:CO ratio and the presence of low levels of sulfide impurities; and their ability to function at low $H_2$:CO ratios. Cobalt-based catalysts are considerably more expensive and can show strong sensitivity to $H_2$:CO ratio. However, cobalt-based catalysts, in general, exhibit higher overall activity and increased mechanical strength compared to iron-based catalysts. Additionally, under like conditions, cobalt-based catalysts tend to produce a distribution of hydrocarbons that is more heavily weighted toward high carbon number species (i.e., give a higher chain growth probability, α) than the hydrocarbon distribution produced using iron-based catalysts. Iron-based F-T catalysts can also produce copious quantities of carbon dioxide in the F-T process, which is generally detrimental, because they can exhibit activity as an internal forward water-gas-shift catalyst.

The utility of F-T synthesis catalysts is significantly decreased if there is significant conversion of CO to $CO_2$ rather than to value-added hydrocarbon and oxygenated hydrocarbon products. Preferred F-T synthesis catalysts exhibit low $CO_2$ production particularly in combination with high CO conversion rates. An F-T catalyst may exhibit product selectivity for a desirable product composition. For example, certain F-T catalysts exhibit selectivity for production of higher molecular weight hydrocarbons, for production of low molecular weight hydrocarbons (e.g., low molecular weight olefins), for production of product with higher or lower amounts of olefinic materials, or for the production of product with higher or lower amounts of oxygenated materials (e.g., alcohols). Product selectivity of an F-T catalyst can be a significant factor in the utility of that catalyst for a given application.

The design and selection of F-T catalysts for low $CO_2$ production and selective applications should consider the following composition related issues: whether the mechanism of adsorption of CO to the catalyst is associative or dissociative; the relative strengths of adsorption of CO and hydrogen to the catalyst; the redox activity or ease of reducibility of metals which is related to their activity for water-gas-shift reaction; the presence of strong or elastic bonds between component atoms of the catalysts support (if any), leading to larger elastic constants and higher mechanical strength of the catalyst support or support framework. Additionally, F-T synthesis can strongly depend on catalyst morphology, e.g., pore size, pore size distribution and particle size of the catalyst, because of the influence of such parameters on mass transport, and on the coupling between mass transport and chemical reaction. An additional factor that can be considered is catalyst acidity, because this property is expected to strongly influence hydrocracking activity by a catalyst, which is preferably to be avoided.

F-T synthesis is a process that involves an unusually high degree of interaction between reaction chemistry, catalyst properties, mass transport, reactor design, overall system integration, and economics. Catalyst selection and reactor design for a given F-T application depends upon all of these factors. For example, a cobalt catalyst may be appropriate for natural gas conversion to liquid hydrocarbons where its advantages in increased activity and longevity are beneficial. Because cobalt catalysts are sensitive to feed composition (i.e., $H_2$:CO ratio), the F-T system employing the cobalt catalyst may then require a water-gas-shift module upstream of the F-T catalyst when low hydrogen content sources (such as coal) are used to ensure that the appropriate $H_2$:CO ratio is provided. In contrast, unsupported baseline precipitated iron catalysts may not be amenable for use in slurry phase or fluidized bed reactors because of their lower mechanical strength and correspondingly high attrition rate, but would be preferred in other applications because of their relative insensitivity to $H_2$:CO ratio and their product selectivity characteristics (i.e., greater selectivity for production of C5 or higher products at low $H_2$:CO ratios). There is a continuing need in the art for catalysts for F-T synthesis which exhibit one or more beneficial characteristics for a given application, given $H_2$/CO feedstock, given reactor design, and/or a desired product composition.

A large number of F-T catalysts are known in the art. The description that follows provides a brief summary of such catalysts.

U.S. Pat. No. 6,602,921 (Manzer) reports catalysts useful in a F-T process for producing hydrocarbons which comprise certain metals, i. e. cobalt, iron, nickel, or ruthenium and combinations thereof, in addition to silver supported on a catalyst support, such as alumina, zirconia, sulfated zirconia, tungsten oxide-doped zirconia, MCM-41, zeolites, clays, titania or silica. Catalytic activity is reported to be increased by the addition of silver.

U.S. Pat. No. 6,537,945 (Singleton et al.) reports an F-T catalyst comprising a gamma-alumina support doped with lanthanum oxide and barium oxide for increased thermal stability in a slurry bubble column reaction system and containing cobalt promoted with ruthenium as the active catalyst component. Catalyst activities are expressed in g-HC/Kg-cat/hr. (grams of hydrocarbon produced per gram of catalyst per hour), a measure of hydrocarbon productivity.

U.S. Pat. No. 6,515,035 reports a catalyst comprising at least one metal from Groups 8, 9 or 10 of the Periodic Table (IUPAC) impregnated on a modified alumina support that is pre-reduced using at least one reducing compound, for example selected from the group formed by hydrogen, carbon monoxide and formic acid, optionally mixed with an inert gas, for example nitrogen, in a reducing compound/(reducing compound+inert gas) mole ratio in the range of 0.001:1 to 1:1. The reduction may be carried out in the liquid phase with the catalyst suspended in an inert liquid phase.

U.S. Pat. No. 6,313,062 relates to the preparation of an F-T catalyst comprising a Group VII noble metal and an "Iron Group metal" (preferably cobalt) on a support. The catalysts are reported to have "high activity."

U.S. Pat. Nos. 6,271,432 and 6,191,066 relate to F-T catalysts which are non-promoted cobalt catalysts supported on alumina which is preferably doped with titanium. U.S. Pat. No. 6,262,132 relates to a method for producing an attrition-resistant catalyst which employs an attrition-resistant support that is a titanium-doped gamma alumina. U.S. Pat. No. 6,100,304 relates to F-T catalysts which are certain supported palladium promoted cobalt catalysts. U.S. Pat. No. 5,939,350 relates to processes and catalysts for F-T synthesis in a slurry bubble column reactor (SBCR). The patent reports the use of certain non-promoted cobalt catalysts and certain palladium-promoted cobalt catalysts in the SBCR.

U.S. Pat. No. 5,856,365 relates to the preparation of a catalyst useful for conversion of synthesis gas wherein the catalyst comprises cobalt, ruthenium and either scandium or yttrium on an inert support. The support can be selected from at least one oxide of at least one of Si, Ti, Al, Zr, Zn, Mg, and Sn.

U.S. Pat. No. 5,728,918 reports a catalyst comprising cobalt on a support, used for conversion of synthesis gas with an $H_2$:CO ratio of 1-3, preferably 1.8-2.2, to C5+ hydrocarbons at a pressure of 1-100 bar and at a temperature of 150-300° C., at a typical gas hourly space velocity of 1000-6000 v/hr/v. This catalyst is reported to be regenerated by contacting it with a gas containing carbon monoxide and less than 30% hydrogen, at a temperature more than 10° C. above Fischer-Tropsch conditions and in the range 100-500° C., and at a pressure of 0.5-10 bar, for air, at least 10 minutes, preferably 1-12 hours. The contact time period depends on temperature and gas hourly space velocity. This patent also reports an activation procedure, which may include a first step of contacting the catalyst with a gas containing molecular oxygen, preferably air at 200-600° C., at atmospheric pressure, for more than 30 minutes, and preferably for 1-48 hours.

U.S. Pat. Nos. 5,292,705 and 5,389,690, both to Mitchell, describe a fresh, previously reduced hydrocarbon synthesis catalyst activated by contact with hydrogen at elevated temperatures and pressures and in the presence of liquid hydrocarbons, preferably, sufficient to immerse the catalyst therein.

U.S. Pat. No. 5,292,705 relates to a method for activating a hydrocarbon synthesis catalyst by treating a reduced, "essentially fresh" (unused) catalyst with hydrogen in the presence of hydrocarbon containing liquids. The method is exemplified with a titania/alumina supported Co-Re catalyst.

U.S. Pat. No. 5,248,701 (Soled et al.) relates to a copper-promoted cobalt manganese spinel catalyst useful in F-T synthesis. The spinel is described as having the formula: $Co_{3-x}Mn_xO_4$, where x is from 0.5 to about 1.2. The patent also reports the formation of this cobalt-manganese mixed metal catalyst in an acidic aqueous solution containing alpha-hydroxy carboxylic acids rather than in alkaline solution to provide the spinel with high BET surface area of at least 5 $m^2/g$. The copper promoter is reported to be preferably present in the catalyst from about 0.1 to about 5 gram atom %. While a relatively high level of CO conversion is reported for the catalysts tested, a significant amount of the CO was converted to carbon dioxide. This patent provides a brief description of several additional U.S. patents which relate to iron-cobalt spinel catalysts for F-T synthesis, including U.S. Pat. Nos. 4,518,707; 4,584,323 and 4,607,020, which relate to iron-cobalt spinels for selective conversion of syngas to alpha-olefins and where the spinels may be reduced and carburized, copper-promoted or carbided in situ, U.S. Pat. Nos.

4,537,867; 4,544,672 and 4,544,674, which relate to iron-cobalt spinels containing low levels of cobalt for selective conversion of syngas to low molecular weight (C2-C6) olefins and where the spinel may be promoted or reduced and carbided.

U.S. Pat. No. 5,140,050 (Mauldin et al.) relates to catalysts useful in F-T synthesis which are prepared on binder-containing titania supports. Catalysts are prepared by dispersing catalytic amounts of metal or metals, on the support. Preferred metals are cobalt or a combination of cobalt with another metal.

U.S. Pat. No. 5,145,876 (Shutt) reports a F-T catalyst that is ruthenium metal supported on a high surface area support and which is promoted employing bromine moieties. The preferred support is gamma-alumina. The specific source of ruthenium and bromine for catalyst preparation is disclosed as an aqueous solution of ruthenium bromide, such as ruthenium tribromide.

U.S. Pat. No. 4,861,802 (McCann) reports a modified F-T process utilizing certain perovskite catalysts for the synthesis of low molecular weight olefinic hydrocarbons. The catalyst comprise a perovskite oxide of the empirical formula $AB_{1-a}Fe_aO_3$, wherein A is selected from cations of the alkali metals, alkaline earth metals, lanthanides, Th or U, B is selected from cations of certain transition metal or main group elements (Al, Ga, In, Tl, Ge, Sn, Pb, Sc, Y, Ti, Zr, HF, V, Nb, Ta, Cr, Mo, W, Mn, Tc, Re, Ru, Os, Co, Rh, Ir, Ni, Pd, Pt, Cu, Ag, Au, Zn, Cd, or Hg) and a is within the range 0.01 to 1. The perovskites tested exhibited at most about 8% conversion of CO with a large amount of the converted CO going to $CO_2$.

U.S. Pat. No. 4,738,948, issued on Apr. 19, 1988, describes a catalyst comprising cobalt and ruthenium at an atomic ratio of 10-400, on a refractory carrier, such as titania or silica. The catalyst is used for conversion of synthesis gas with an $H_2$:CO ratio of 0.5-10, preferably 0.5-4, to C5-C40 hydrocarbons at a pressure of 80-600 psig and at a temperature of 160-300° C., at a gas hourly space velocity of 100-5000 v/hr/v. This catalyst is reported to be regenerated by contacting it with hydrogen gas at 150-300° C., preferably 190-260° C., for 8-10 hours.

U.S. Pat. No. 4,595,703 reports a catalyst comprising cobalt or thoria promoted cobalt on a titania support, used for conversion of synthesis gas with an $H_2$:CO ratio of 0.5-4, preferably 2-3, to C10+ hydrocarbons at a pressure of preferably 80-600 psig, and at a temperature of 160-290° C., at a gas hourly space velocity of 100-5000 v/hr/v. This catalyst is reported to be regenerated by contacting it with hydrogen gas, or a gas which is inert or non-reactive at stripping conditions such as nitrogen, carbon monoxide, or methane, at a temperature substantially the same as Fisher-Tropsch conditions. If it is necessary to remove coke deposits from the catalyst, the catalyst can be contacted with a dilute oxygen-containing gas, at oxygen partial pressure of at least 0.1 psig, at 300-550° C., for a time sufficient to remove coke deposits, followed by contact with a reducing gas containing hydrogen, at a temperature of 200-575° C. and at a pressure of 1-40 atmospheres, for 0.5-24 hours.

U.S. Pat. No. 4,585,798 reports a catalyst comprising cobalt and ruthenium in an atomic ratio greater than about 200:1 and, preferably, a promoter, such as a Group IIIB or IVB metal oxide, on an alumina support, used for conversion of synthesis gas to hydrocarbons at a pressure of preferably 1-100 atmospheres and at a temperature of 160-350° C., at a gas hourly space velocity less than 20,000 v/hr/v, preferably 100-5000 v/hr/v, especially 1000-2500 v/hr/v, which is reported to be activated prior to use by reduction with hydrogen gas, followed by oxidation with diluted air, followed by further reduction with hydrogen gas.

U.S. Pat. No. 4,544,671 (Soled et al.) relates to F-T synthesis catalysts which are slurried high surface area iron-cobalt spinels and to a slurry process employing the catalysts. The catalysts are certain unsupported Group IA or IIA metal salt-promoted Fe—Co spinels. The patent reports certain high surface area (100-200 $m_2$/g) Fe—Co spinels prepared in an acid aqueous solution containing alpha-hydroxy carboxylic acids. The iron to cobalt atomic ratio of the metals in the spinel is reported to be 4:1 or above. The catalysts are reported to be useful in slurry processes for selectively producing high amount of C2 to C20 alpha-olefin materials.

U.S. Pat. No. 4,151,190 reports a catalyst comprising at least one of a sulfide, oxide, or metal of Mo, W, Re, Ru, Ni, or Pt, at least one of a hydroxide, oxide, or salt of Li, Na, K, Rb, Cs, Mg, Ca, Sr, Ba, or Th, and a support, used for conversion of synthesis gas with an $H_2$:CO ratio of 0.25-4.0, preferably 0.5-1.5, to $C_2$-$C_4$ hydrocarbons at a pressure of 15-2000 psia and a temperature of 250-500° C. at a typical gas hourly space velocity of 300 v/hr/v. This catalyst is reported regenerated by contacting it with hydrogen gas at 500-600° C. for 16 hours.

Moser et al. (Moser, W. R., Lennhoff, J. D., Cnossen, J. E., Fraska, K., Schoonover J. W., and Rozak, J. R. (1996) in "Advanced Catalysts and Nanostructured Materials; Modern Synthetic Methods" (Moser, ed.) Academic, San Diego, Calif., p. 540) reports the synthesis and testing of certain perovskite compositions by spray pyrolysis or high temperature aerosol decomposition (HTAD). The materials synthesized have the general stoichiometry: $La_{(1-x)}M_xFeO_3$, where M is $Ca^{2+}$ or $Sr^{2+}$; $La_{(1-x)}Ln_xFeO_3$, where Ln is certain unidentified lanthanide ions; and $La_{(1-x)}Sr_xCoO_3$ where in each case x ranges between 0.0 to 1.0, as well as certain unidentified perkovskites in the $LaCoO_3$ and $LaFeO_3$ series "having two additional ions modifying both the A- and B-sites simultaneously." All of the perovskites tested were reported to be catalytically activity for F-T synthesis. However little detail of the catalytic activity of the catalysts as a function of structure was provided. CO consumption rate (normalized to unit surface area) for the $La^{(1-x)}Ca_xFeO_3$ series as a function x from 0.0 to 0.8 was illustrated in FIG. 3 of the reference to increase with increasing x value (i.e. increasing Ca content). It was also reported that the surface areas of the perovskites could be varied from 10 to 50 $m_2$/g and that the perovskites prepared had little to no micropore structure. Perovskites prepared by classical synthesis by high temperature fusion techniques were reported to result in materials having much lower surface areas (0.1-1 $m_2$/g) compared to HTAD materials and in materials in which the perovskite could not be obtained free from separate phases of the component metal oxides.

Goldwasser et al. J. Mol. Catalysis A: Chemical 193(2003) 227-236 report a series of iron perovskite oxide materials containing K or Mn or both as precursors for conversion of syngas to low molecular weight alkenes the having the general composition:

where $0 \leq x$, $y \leq 0.2$, specifically La Fe $O_3$, $La_{0.9}K_{0.1}FeO_{2.9}$, $LaO_{0.8}K_{0.2}FeO_{2.9}$, $LaFe_{0.8}Mn_{0.2}O_3$, and $La_{0.9}K_{0.1}Fe_{0.9}Mn_{0.1}O_{2.9}$. The active catalysts are prepared by reduction of the raw catalyst. Prior to assessing catalytic activity the perovskite oxides were subjected to reduction at 450° C. in a flow of $H_2$ (30 mL/min/g catalyst) for 16 h followed by exposure to CO (10 mL/min/g catalyst) for 8 h at 150° C. and for carburated catalysts at 350° C. for 14 h. The activity of the perovskite-based catalysts was reported to seem to be directly related to the formation of Hatgg carbides. For conversion of a mixture where $H_2/CO=2$, $SCO_2(\%)$ ($CO_2$ selectivity) of 30 or more was observed.

SUMMARY OF THE INVENTION

The present invention provides catalyst compositions and methods for F-T synthesis which exhibit high CO conversion with minor levels (preferably less than 35% and more preferably less than 5%) or no measurable carbon dioxide generation. More specifically, the invention provides method for hydrocarbon production employing a feed stream comprising hydrogen, carbon monoxide, and carbon dioxide in a F-T reactor wherein the total mass flow rate of $CO_2$ out of the reactor is less than or equal to the amount of $CO_2$ in the feed gas stream. Preferably the total mass flow rate of $CO_2$ out of the reactor is less than 90% by weight of the $CO_2$ in the feed stream. More preferably, the total mass flow rate of $CO_2$ out of the reactor is less than the amount of $CO_2$ in the feed gas stream. Preferably the method exhibits CO conversion greater than 20 mole % and more preferably exhibits CO conversion is greater than 50 mole %. The invention also provides such catalytic processes where CO conversion is 75% or more.

In preferred embodiments employing catalysts of this invention, F-T synthesis is carried out to achieve highest CO conversion without excessive $CO_2$ generation (greater than 35% conversion to $CO_2$). F-T synthesis can be carried out using the methods and catalysts herein to obtain CO conversion of greater than 60 mole %. Methods of this invention can achieve CO conversion of between 65 mole % and 90 mole % preferably without excessive $CO_2$ production. Conversion to $CO_2$ is preferably minimized and when CO conversion is between 65 mole % and 90 mole % $CO_2$ conversion is preferably less than 35 mole % and more preferably less than 20 mole %. In addition, it is preferred that conversion to methane is minimized and preferably conversion to methane is less than 10 mole % and more preferably less than 8 mole %. In more preferred embodiments, selectivity for products other than $CO_2$ and methane is 70 mole % -100 mole %.

In a specific embodiment the methods of this invention the methods employ an oxygen-deficient mixed metal catalyst which have been exposed to a reducing gas to activate the catalyst. The unfinished catalysts of the invention have the formula:

$$A_u A'_v A''_w B_x B'_y B''_z O_n$$

where the subscripts u, v, w, x, y, z are normalized to give $u+v+w+x+y+z$ equal to a whole number and n is a number that renders the compound charge neutral; wherein:

A=$Ca^{2+}$, $Mg^{2+}$, $Sr^{2+}$, $Ba^{2+}$ or mixtures thereof;

A'=$Y^{3+}$, $La^{3+}$, any lanthanide metal 3+ ion, or mixtures thereof;

A"=$Li^+$, $Na^+$, $K^+$, or $Cs^+$;

B=Fe, Co, Ni, or Ru ion or a mixture of these ions;

B' is a Boron, Al, Ga, or In +3 ions or a mixture of these +3 ions;

B" is a $Cu^{2+}$ or $Zn^{2+}$ ion or a mixture of these 2+ ions;

$0.01 \leq u \leq 1.99$ $0.01 \leq v \leq 1.99$ $0.0 \leq w \leq 0.1$ $0.01 \leq x \leq 3.0$ $0.01 \leq y \leq 1.99$ and $0.0 \leq z \leq 1.0$.

More specifically in this formula, $u+v+w+x+y+z=4$ and n is equal to 6-δ, where δ is a number that makes the compound charge neutral and variables are as defined above.

The invention provides unfinished catalysts which can be activated by reduction in situ in a F-T reactor or which can be activated by reduction prior to introduction into a reactor. Preferred finished catalysts contain reduced Co, Cu, Fe, Mn, Ni, Ru or combination of these reduced metals. Unfinished catalysts of this invention include without limitation metal oxides of formulas I-IV, all of which function for F-T synthesis after activation by reduction. In specific embodiments, the catalysts of this invention are prepared from oxygen deficient mixed metal oxides which are formed by coprecipitation, glycine-nitrate combustion, impregnation, or a ceramic method. Catalysts prepared from coprecipitated metal oxides and those formed by glycine-nitrate combustion exhibit improved properties as catalysts for F-T synthesis.

The invention provides methods for reductive oligomerization of carbon monoxide (CO) in the presence of molecular hydrogen (H2) which comprise the step of contacting a mixture comprising CO and H2 with a catalyst which is an oxygen-deficient metal oxide that has been subjected to reduction prior to contact with the mixture. The feed mixture optionally contains CO2. The method is conducted under temperature and pressure conditions selected to achieve a desired product composition. Preferred products contain hydrocarbon species having 5 or more carbon atoms (C5+). In preferred embodiments the catalytic reductive oligomerization is conducted between about 175° C. and 350° C. and more preferably is conducted at a temperature of 300° C. or less.

F-T synthesis employing catalysts of this invention can be carried out over a wide range of space velocities. In particular, the method can be carried out at space velocity ranging from 1-50 mL/minute g catalyst. The method can be carried out at space velocity ranging from 10 to 40 mL/minute g catalyst

BRIEF DESCRIPTION OF THE FIGURES

Not Applicable

DETAILED DESCRIPTION OF THE INVENTION

Fischer-Tropsch (F-T) synthesis involves the catalytic reductive oligomerization of carbon monoxide in the presence of hydrogen to form hydrocarbons (paraffinic and olefinic), Generally, the process converts a mixture of CO and molecular hydrogen into a mixture of hydrocarbons, including saturated hydrocarbons and olefins. The product stream of F-T synthesis contains a mixture of hydrocarbon products having a range of molecule weights and including gaseous and liquid hydrocarbons at reaction temperature. The product stream when assessed at ambient temperature and pressure can contain gases, liquids and waxy hydrocarbons. The product stream may contain linear and branched hydrocarbons. The nature of the product stream generally depends upon the reaction conditions (e.g., temperature) and the catalyst employed. When the reaction is conducted at lower temperatures the product stream generally contains a majority of linear hydrocarbons.

Hydrocarbons in the product stream can be characterized by the number of carbon atoms present, and can be grouped into fractions based on a common carbon number. A well-established statistical treatment (Anderson-Shultz-Flory method) that had been developed for polymerization reactions based on a step-wise chain growth mechanism has been applied for product analysis in F-T synthesis. In this treatment chain growth probability is plotted as a function of chain length in a so-called Anderson-Shultz-Flory plot. The slope of this plot is the Anderson-Shultz-Flory value "alpha" or more simply, the alpha value, also called the growth factor. This statistical treatment can be used to characterize the distribution of hydrocarbons obtained from F-T synthesis, and the alpha value is defined as the probability of chain growth step to the next higher carbon number divided by the sum of the growth step probability plus the chain termination probability. The alpha value can be used to estimate the distribution of carbon number products and thereby the effectiveness of the process to furnish a product stream having a particular carbon number distribution. The alpha value generally depends on the catalyst and the operating conditions (temperature and pressure) and the concentrations, and the relative concentrations of feed gas components (e.g., CO, hydrogen, CO2, etc.) It is generally known in the art that F-T reaction conditions can be adjusted to vary the hydrocarbon content of the product stream. In a given F-T synthesis, alpha can be determined from analysis of the hydrocarbon products of the reaction (carbon number of hydrocarbon products and the mole fraction of the various products.) Alpha is determined as known in the art, for a single product or for a range of products. For example, alpha can be calculated from experimental data using the Flory expression:

$$m_n = (1-\alpha)\alpha(n-1)$$

where $m_n$=mole fraction of molecules containing n carbon atoms. Alpha is obtained by taking the logarithm of both sides and obtaining the slope of the ln mn line versus n. The alpha values that are reported herein are average alpha for $C_n$ hydrocarbons between n=6 and n=24.

A preferred F-T synthesis product stream is a hydrocarbon product in which the majority of hydrocarbons have more than 5 carbon atoms (herein such products are called C5+ products). These may include hydrocarbon fractions in which the majority of the hydrocarbons contain 4-12 carbon atoms, as well as hydrocarbon fractions in which the majority of the hydrocarbons contain 10-22 carbon atoms. Such fractions are a useful source for fuels such as diesel, gasoline and aviation fuels. In particular, it is preferred that the F-T product stream has high average alpha that it alpha numbers higher than 0.65. More specifically, a preferred F-T product stream for use as fuels is one that has alpha between 0.65 and 1.0. More preferably, an F-T product stream having alpha of 0.75 or more are useful for fuel applications. F-T catalysts of this invention can be employed to generate C5+ hydrocarbon products. F-T catalysts of this invention can be employed to generate hydrocarbon products with alpha greater than or equal to 0.65. F-T catalysts of this invention can be employed to generate hydrocarbon products with alpha greater than or equal to 0.75. In general, catalysts herein can be employed in combination with lower F-T temperatures (300° C. or less) and lower H2:CO (i.e., less than 1.0, more preferably 0.6 to 1.0) ratios to generate hydrocarbon products with high average alpha values which are useful in fuel applications.

More specifically, the invention provides methods for production of hydrocarbons which comprise the steps of introducing a feed stream gas comprising CO and hydrogen into an F-T reactor which reactor contains an activated catalyst of this invention. In the reactor, the feed gas is catalytically converted to a product stream. The product can be collected and characterized for the components present or remaining and generally characterized for the number of carbon atoms in the hydrocarbons produced. The reactor is operated at temperatures and pressures to obtain a desired product stream. For example, the reactor can be operated at pressures ranging from 100 psig to 1200 psig and at temperatures ranging from 175° C. to 350° C. It is generally more preferred to operate at pressures between 200-600 psig. It is more preferred, particularly to obtain hydrocarbons useful fro fuel applications to operate the reactor at temperatures less than about 300° C.

The feed stream gas for the F-T reactor comprises a mixture of $H_2$ and CO, (synthesis gas) $H_2$/CO mixtures suitable as a feedstock for conversion to hydrocarbons can be obtained from various sources, for example, from light hydrocarbons, including methane or other hydrocarbons in natural gas, by means of various reforming processes, including steam reforming, auto-thermal reforming, dry reforming, advanced gas heated reforming, and by partial oxidation, catalytic partial oxidation. Other processes known in the art can be employed to generate suitable feed gas streams for F-T synthesis. Additionally, $H_2$/CO mixtures can be obtained from biomass and/or from coal gasification. The feed stream gas may also contain off-gas recycle from an F-T reactor. It is preferred that the molar ratio of hydrogen to carbon monoxide in the feed be greater than 0.5:1 (e.g., from about 0.67 to about 2.5). More preferably, the reactant gas contains hydrogen and carbon monoxide in a molar ratio of about 1.4:1 to about 2.3:1. The feed stream gas can also contain $CO_2$. The feed stream gas preferably contains only low concentrations of compounds or elements that can detrimentally affect catalyst activity. It may be necessary or beneficial to remove or decrease the concentration of such detrimental materials from the feed stream gas by pre-treatment to decrease or avoid catalyst deactivation. Potentially detrimental species include hydrogen sulfide, hydrogen cyanide, ammonia, and carbonyl sulfides.

The F-T product stream contains hydrocarbons, water and may contain unconverted CO as well as CO2. The feed stream may contain CO2 which survives the reaction and exits in the product stream. In addition, CO2 may be produced in the reactor which is generally undesirable. In specific embodiments herein employing catalysts of this invention, only very low levels or no CO2 is produced in the F-T reactor. Preferably, the amount of CO2 entering the reactor is less than or equal to the amount of CO2 exiting the reactor in the product stream. CO2 levels can be assessed, for example, by measurement of the total mass flow rate of CO2. When this measurement is used, the total mass flow rate of CO2 which leaves the reactor is preferably less than or equal to the amount of CO2 in the feed gas stream. In specific embodiments, F-T methods of this invention can be employed to generate product steams in which the mass flow rate of CO2 out of the reactor is less than 90% of the mass flow rate of CO2 in the feed stream. In specific embodiments, F-T methods of this invention can be employed to generate product steams in which the mass flow rate of CO2 out of the reactor is less than the mass flow rate of CO2 in the feed stream.

Mass flow rate of gases in the feed gas stream and in the product stream can be measured by any method known in the art. This is one method by which such comparisons can be made, but other methods are known in the art and can be employed to assess feed stream components and product stream components.

Employing catalysts of this invention, CO conversion greater than 20 mole % can be obtained. In preferred embodiments, employing catalysts of this invention Co conversion rates greater than 50 mole % and greater than 75 mole % can be obtained.

The invention further relates to methods of carrying out Fischer-Tropsch synthesis employing one or more catalysts of the present invention. In general, the F-T synthesis can be carried out in any known reactor type as described in more detail below. In specific embodiments the catalysts of this invention are employed in slurry type catalyst systems. Catalysts of this invention can be employed in a slurry with an appropriate hydrocarbon oil. In specific embodiments, a catalyst of this invention is present in such a slurry from about 1.0% to about 10% by weight.

In specific embodiments, the invention provides methods for conversion of CO and hydrogen mixtures, particularly those generated by coal, biomass, or waste gasification processes or by the reforming or partial oxidation of natural gas to products containing mixtures of hydrocarbons, particularly products that are liquid hydrocarbon mixtures. In more specific embodiments, the invention provides methods for preparation of clean fuels, such as diesel fuels, which have little or no sulfur or nitrogen contaminants.

Reactor space velocity herein is the rate of flow of feed stream gases normalized for the amount of catalyst at STP. More specifically, it is the volume of gas for a given time and a given amount of catalyst and can be expressed as mL of feed stream gas (e.g., synthesis gas) /min/g catalyst. The catalysts of this invention can be employed for F-T synthesis over a wide range of space velocities, e.g., from 1-50 mL feed stream gas/g catalyst, or in terms of GHSV (gas hourly space velocity again at STP) from 10 to 10,000 h-1. As will be appreciated in the art, the range of reactor space velocities employed in a given catalytic reaction will depend upon the type and size of reactor employed, the feed stream components, the type of catalyst, other operating conditions (e.g., pressure and temperature). One of ordinary skill in the art can select appropriate space velocity for a given catalytic reaction, in a selected reactor and set of operating conditions. It will be appreciated that space velocity for a given catalytic reaction in a given reactor under selected operating conditions can be optimized to achieve improvement in a desired product composition. In general, in the F-T synthesis herein decreasing space velocity results in higher conversion to products, but can also result in higher yields of undesired $CO_2$ at a fixed temperature.

Reactor Types/Configurations for Use with the Catalysts of the Invention:

There are four preferred reactor types that can be employed with the catalysts of the present invention: 1) Slurry phase or continuously stirred tank reactor (CSTR), 2) fluidized bed, 3) slurry bubble column, and 4) fixed bed reactors. The reactor type selected depends on the catalyst employed, reaction conditions, and products desired. For example, the first three reactor types involve much motion of catalyst particles. Materials which are robust and mechanically strong can be employed in the fluidized bed, CSTR, and slurry bubble column reactors. Less resilient catalysts can be used in these reactors if they are inexpensive enough (e.g., Fe-containing catalysts). However, use of the fixed bed reactor is preferred with these materials.

The choice of reactor type also depends on the efficiency of heat removal. This influences not only the FTS reaction but activation of the catalyst. For example, copper and Fe-containing catalysts are particularly subject to deactivation by sintering if the reduction exothermicity is not adequately removed. Fixed bed reactors are least efficient in heat removal and the other types better suited to this purpose. The same can be said for the FTS reaction.

F-T synthesis can be carried out in fixed bed reactors in which the reactant gas mixture is passed over a bed of solid catalyst. For example, a fixed bed reactor can comprise a plurality of tubes or catalyst containers within a reactor shell. Due to the high exothermicity of the synthesis, all F-T reactor designs require adequate provisions for temperature control to prevent reaction runaway. In fixed bed reactors, excess heat can be carried away by forming steam from water, which is added to the reactor shell surrounding the tubes.

F-T synthesis can be carried out in fluidized bed reactors. Fluidized bed reactors for low-temperature F-T reactors are also called slurry bubble column, slurry bed, slurry phase, or multiphase reactors, and consist of a reactor shell containing a slurry comprising catalyst particles and a hydrocarbon liquid phase. The reactor shell and the slurry are typically cooled employing cooling coils. The feed gas stream is introduced into the slurry. The reactor typically has a feed stream distribution system that introduces the feed stream at the bottom of the slurry, for example as small gas bubbles that rise up through the slurry. The gases of the feed stream diffuse through the liquid phase in the slurry encounter catalyst particles and react. Heavier hydrocarbons that may be produced are liquid under typical reactor operating temperatures and pressures and are incorporated into the slurry. Lighter gaseous products (at reaction temperature and pressure) and water vapor pass out of the slurry and can be collected as a product stream. Unconverted reactants can be recycled.

Fixed bed reaction may overheat reducing catalyst lifetime by deactivation and/or coke formation. In general fluidized bed reactors can tolerate higher average operating temperatures than fixed bed reactors without such problems. In a fixed bed reactor, operation must be typically be halted to replace or regenerate catalyst. In a fluidized bed process, catalyst additions and catalyst regenerations can be performed while the reactor is operating in a continuous mode.

Sie and Krishna (Appl. Catalysis A: General 1999, 186, p. 55) give an overview of the development of various F-T reactors and discuss the advantages of slurry bubble reactors over fixed bed reactors.

Operating Temperature Range for Catalysts of the Present Invention:

The preferred operating temperature range of materials of the present invention depends on the composition of materials. In particular, Cobalt-containing materials are more active at a given temperature and are thus more useful at lower temperatures than Iron-containing materials of the same overall stoichiometry. Cobalt-containing materials are applicable at temperatures as low as 180° C. and temperatures as high as 280° C. Iron-containing materials are useful at temperatures between 200 and 350° C. The effect of temperature on product selectivity is anticipated to be similar in both cases: α, the chain growth probability in the Anderson-Flory-Schultz (AFS) distribution, decreases with increasing temperature. Thus, decreased production of heavier hydrocarbons, including waxes, is expected as the temperature is increased. In addition, increased aromatic content and chain branching, i.e., more favorable conditions for gasoline production, will occur. Increased CO conversion and increased yield of $CO_2$, owing to greater activity towards both FTS and water-gas shift tend to occur.

Most generally the invention provides unfinished catalysts of formula I:

$$A_u A'_v A''_w B_x B'_y B''_z O_n$$

where the subscripts u, v, w, x, y, z are normalized to give u+v+w+x+y+z equal to a whole number and n is a number that renders the compound charge neutral. More specifically u+v+w+x+y+z=4 and n is equal to 6-δ, where δ is a number that makes the compound charge neutral and wherein:

A=$Ca^{2+}$, $Mg^{2+}$, $Sr^{2+}$, $Ba^{2+}$ or mixtures thereof;
A'=$Y^{3+}$, $La^{3+}$, any lanthanide metal 3+ ion, or mixtures thereof;
A''=$Li^+$, $Na^+$, $K^+$, or $Cs^+$;
B=Fe, Co, Ni, or Ru ion or a mixture of these ions;
B' is a Boron, Al, Ga, or In +3 ions or a mixture of these +3 ions;

B" is a $Cu^{2+}$ or $Zn^{2+}$ ion or a mixture of these 2+ ions; and wherein:
$0.01 \leq u \leq 1.99$
$0.01 \leq v \leq 1.99$
$0.0 \leq w \leq 1.0$
$0.01 \leq x \leq 3.0$
$0.01 \leq y \leq 1.99$ and
$0.0 \leq z \leq 1.0$.
In specific embodiments:
A1. $0.01 \leq u \leq 1.99$
$0.01 \leq v \leq 1.99$
$0.0 \leq w \leq 0.25$
$0.01 \leq x \leq 1.99$
$0.01 \leq y \leq 1.99$ and
$0.0 \leq z \leq 1.0$;
A2. $0.10 \leq u \leq 1.99$
$0.10 \leq v \leq 1.99$
$0.0 \leq w \leq 0.25$
$0.10 \leq x \leq 1.99$
$0.01 \leq y \leq 1.99$ and
$0.0 \leq z \leq 1.0$;
A3 $0.10 \leq u \leq 1.99$
$0.10 \leq v \leq 1.99$
$0.0 \leq w \leq 0.25$
$1.0 \leq x \leq 1.99$
$0.01 \leq y \leq 1.99$ and
$0.0 \leq z \leq 1.0$;
A4 $0.10 \leq u \leq 1.99$
$0.10 \leq v \leq 1.99$
$0.0 \leq w \leq 0.25$
$1.0 \leq x \leq 3.0$
$0.01 \leq y \leq 1.99$ and
$0.0 \leq z \leq 1.0$;
A5 $0.10 \leq u \leq 1.0$
$0.10 \leq v \leq 1.0$
$0.0 \leq w \leq 0.25$
$1.0 \leq x \leq 1.99$
$0.01 \leq y \leq 1.99$ and
$0.0 \leq z \leq 1.0$;
A6 $0.10 \leq u \leq 1.0$
$0.10 \leq v \leq 1.0$
$0.0 \leq w \leq 0.25$
$1.0 \leq x \leq 3.0$
$0.01 \leq y \leq 1.99$ and
$0.0 \leq z \leq 1.0$;
A7 $0.10 \leq u \leq 1.0$
$0.10 \leq v \leq 1.0$
$0.0 \leq w \leq 0.25$
$1.0 \leq x \leq 1.99$
$0.01 \leq y \leq 1$ and
$0.0 \leq z \leq 1.0$;
A8 $0.10 \leq u \leq 1.0$
$0.10 \leq v \leq 1.0$
$0.0 \leq w \leq 0.25$
$1.0 \leq x \leq 3.0$
$0.01 \leq y \leq 1$ and
$0.0 \leq z \leq 1.0$;
A9 $0.2 \leq u \leq 0.6$
$0.6 \leq v \leq 1$
$0.0 \leq w \leq 0.1$
$1.0 \leq x \leq 1.99$
$0.01 \leq y \leq 1$ and
$0.0 \leq z \leq 1.0$;
A10 $0.2 \leq u \leq 0.6$
$0.6 \leq v \leq 1.00$
$0.0 \leq w \leq 0.25$
$1.0 \leq x \leq 3.0$
$0.01 \leq y \leq 1.0$ and
$0.0 \leq z \leq 1.0$;
A11 $0.2 \leq u \leq 0.6$
$0.6 \leq v \leq 1$
$0.0 \leq w \leq 0.25$
$1.0 \leq x \leq 1.99$
$0.1 \leq y \leq 0.9$ and
$0.0 \leq z \leq 1.0$;
A12 $0.2 \leq u \leq 0.6$
$0.6 \leq v \leq 1.00$
$0.0 \leq w \leq 0.25$
$1.0 \leq x \leq 3.0$
$0.1 \leq y \leq 0.9$ and
$0.0 \leq z \leq 1.0$;
A13 $0.2 \leq u \leq 0.6$
$0.6 \leq v \leq 1$
$0.0 \leq w \leq 0.25$
$1.3 \leq x \leq 1.99$
$0.1 \leq y \leq 0.9$ and
$0.0 \leq z \leq 1.0$; or
A14 $0.2 \leq u \leq 0.6$
$0.6 \leq v \leq 1.00$
$0.0 \leq w \leq 0.25$
$1.5 \leq x \leq 1.99$
$0.1 \leq y \leq 0.9$ and
$0.0 \leq z \leq 1.0$.
In additional embodiments:
B1 In each of A1-A14, $0.01 \leq w \leq 0.25$ and/or $0.01 \leq z \leq 1.0$;
B2 In each of A1-A14, $0.1 \leq w \leq 0.25$ and/or $0.01 \leq z \leq 1.0$;
B3 In each of A1-A14, $0.1 \leq w \leq 0.25$ and/or $0.1 \leq z \leq 1.0$;
B4 In each of A1 to A14, $0.1 \leq w \leq 0.25$ and $0.1 \leq z \leq 0.7$;
B5 In each of A1 to A14, $w=0.2$ and $0.1 \leq z \leq 0.7$;
C1 In each of A1-A14 and B1-B5, A is $Sr^{2+}$;
C2 In each of A1-A14 and B1-B5, A' is $La^{3+}$;
C3 In each of A1-A14 and B1-B5, B is Fe;
C4 In each of A1-A14 and B1-B5, B is Co;
C5 In each of A1-A14 and B1-B5, B is a mixture of Fe and Co;
C6 In each of A1-A14 and B1-B5, B' is Ga or Al;
C7 In each of A1-A14 and B1-B5, where A" is present A" is $K^+$; or
C8 In each of A1-A14 and B1-B5, where B" is present B" is $Cu^{2+}$.

In specific embodiments, in the catalyst of formula 1, A is $Ca^{2+}$, $Mg^{2+}$, $Sr^{2+}$, $Ba^{2+}$ or mixtures thereof; $A'=Y^{3+}$, $La^{3+}$, any lanthanide metal 3+ ion, or mixtures thereof; $A''=K^+$, or $Cs^+$; B═Fe, or Co ions or a mixture of these ions; B' is Al, Ga, or In +3 ions or a mixture of these +3 ions; and B" is a $Cu^{2+}$ or $Zn^{2+}$ ion or a mixture of these 2+ ions. In these embodiments the subscripts u, v, w, x, y and z can take values as listed above in A1 to A14.

In specific embodiments, catalysts of formula 1 contain 4, 5 or 6 different metal ions.

In other specific embodiments, in the catalyst of formula 1, A is $Ca^{2+}$, $Mg^{2+}$, $Sr^{2+}$, $Ba^{2+}$ or mixtures thereof; $A'=Y^{3+}$, $La^{3+}$, any lanthanide metal 3+ ion, or mixtures thereof; $A''=K^+$, B═Fe, or Co ions or a mixture of these ions; B' is Al or Ga +3 ions or a mixture of these +3 ions; and B" is a $Cu^{2+}$ ion. In these embodiments the subscripts u, v, w, x, y and z can take values as listed above in A1 to A14.

In other specific embodiments, in the catalysts of formula 1, A is $Sr^{2+}$, $A'=Y^{3+}$, $La^{3+}$, any lanthanide metal 3+ ion, or mixtures thereof; $A''=K^+$, B═Fe, or Co ions or a mixture of these ions; B' is Al or Ga +3 ions or a mixture of these +3 ions; and B" is a $Cu^{2+}$ ion. In these embodiments the subscripts u, v, w, x, y and z can take values as listed above in A1 to A14.

In other specific embodiments, in the catalyst of formula 1, A is $Ca^{2+}$, $Mg^{2+}$, $Sr^{2+}$, $Ba^{2+}$ or mixtures thereof; $A'=La^{3+}$;

A"=K$^+$, B=Fe, or Co ions or a mixture of these ions; B' is Al or Ga +3 ions or a mixture of these +3 ions; and B" is a Cu$^{2+}$ ion. In these embodiments the subscripts u, v, w, x, y and z can take values as listed above in A1 to A14.

In other In other specific embodiments, in the catalyst of formula 1, A is Sr$^{2+}$; A'=La$^{3+}$; A"=K$^+$, B is Fe, or Co ions or a mixture thereof; B' is Al$^{+3}$; and B" is a Cu$^{2+}$ ion. In these embodiments the subscripts u, v, w, x, y and z can take values as listed above in A1 to A14.

In other specific embodiments, the unfinished catalysts herein have formula II:

$$Sr_uLa_vK_wFe_xAl_yCu_zO_{6-\delta}$$

wherein: u+v+w+x+y+z=4;
0.20≦u≦0.60
0.60≦v≦1.00
0.01≦w≦0.30
1.5≦x≦2
0.10≦y≦0.9 and
0.1≦z≦0.8.

In specific embodiments of formula II:
0.30≦u≦0.55
0.7≦v≦1.00
0.01≦w≦0.25
1.7≦x≦1.9
0.15≦y≦0.85 and
0.1≦z≦0.7.

In other specific embodiments, the unfinished catalysts herein have formula III:

$$Sr_uLa_vB_xAl_yCu_zO_{6-\delta}$$

wherein: u+v+x+y+z=4;
B is Fe or Co ions or a mixture of these ions
0.1≦u≦0.60
0.60≦v≦1.00
1.5≦x≦3
0.10≦y≦0.9 and
0≦z≦0.8.

In specific embodiments of formula III:
z is 0;
z is 0 and B is Co; or
0.1≦z≦0.8 and B is Fe;
0.1≦z≦0.8 and B is Fe and 1.5≦x≦2.

The invention also provides unfinished catalysts of formula IV:

$$A_uA'_{2-v}B_{2-y-z}B'_yB''_zO_{6-\delta}$$

wherein:
A is Ca$^{2+}$, Mg$^{2+}$, Sr$^{2+}$, Ba$^{2+}$ or mixtures thereof;
A' is Y$^{3+}$, La$^{3+}$, any lanthanide metal 3+ ion, or mixtures thereof;
B is a Co, Fe, Mn, Ni, or Ru ion or a mixture of these ions;
B' is a Boron, Al, Ga, or In or +3 ions or a mixture of these +3 ions;
B" is Cu$^{2+}$ or Zn$^{2+}$;
u, v, x, y and z are numbers wherein;
u+v=2 and x+y+z=2;
0.2≦x≦1.8;
0.2≦y≦1.6; and
0.02≦z≦1.0 and δ is a number that renders the metal oxide charge neutral.

In specific embodiments of formula IV: 0.2≦x≦1.8; 0.2≦y≦1.0; and 0.2≦z≦1.0.

In specific embodiments of Formula IV, B is an ion of Fe or Co or a mixture of Fe and Co ions. In other embodiments, B is an ion or mixture of ions other than those of Fe and/or Co.

In more specific embodiments, the unfinished catalysts of this invention include, among others, those having formula IV wherein:
A is Sr$^{2+}$;
A is a mixture of Sr$^{2+}$ and Ca$^{2+}$;
A' is La$^{3+}$;
A' is a mixture of La$^{3+}$ and a lanthanide metal 3+ ion;
B is Fe or Co;
B is a mixture of Fe and Ni ions;
B is a mixture of Fe and Co ions;
B is a mixture of Fe and Ru ions;
B is a mixture of Fe and Mn ions;
B is a mixture of three listed ions one of which is Fe;
B' is Ga;
B' is Al;
B' is a mixture of Ga and Al; or
B" is Cu$^{2+}$.

In the unfinished catalysts of formula IV any combination of selections for A, A', B, B' and B" metal ions can be made and any combination of subscript values for formula IV can be selected for any of such combinations.

More specifically, a subset of the catalyst compositions of this invention are prepared by reduction of oxygen-deficient mixed metal oxides that are prepared with perovskite-type stoichiometries. The term perovskite-type stoichiometry (also termed perovskite-like stoichiometry in the art) includes formulas ABO$_{3-\delta}$ (where δ is a number that makes the chemical species charge neutral) and A and B can each be one or more metal ions. When δ is zero, the stoichiometry is that of a perovskite. Perovskite-type stoichiometries broadly include perovskites and related species where δ is not zero. Metal oxides of this invention can include perovskites, and/or perovskite-type metal oxides, other than perovskites. Metal oxides of this invention can also be mixtures of various perovskite-type metal oxides(i.e., metal oxides having perovskite-type stoichiometry). Depending on crystallite size obtained, the material may or may not exhibit diffraction patterns of phases of the above crystal structures. Particularly useful catalysts are prepared by reduction of mixed metal oxides containing Cu ions in combination with Fe ions and in combination with Ga or Al ions and Sr and La ions which are prepared with perovskite-type stoichiometry prior to reduction. Useful catalysts are also prepared by reduction of mixed metal oxides containing cobalt ions in combination with Ga or Al ions and Sr and La ions. Additional useful catalysts of the invention are prepared by reduction of Sr/La ion-containing mixed metal oxides which contain one or more of Fe, Co, Cu, Mn, Ni or Ru ions and one or more of Boron, Al, Ga or In ions which preferably exhibit a perovskite-type stoichiometry.

In specific embodiments, finished catalysts of this invention include those made by reduction of a mixed metal oxide of formula I which display low or absent crystallinity and those of formula IV which have a perovskite structure. In specific embodiments, unfinished catalysts of this invention and finished catalysts include those of formula IV which display low or absent crystallinity and those of formula I which have a brownmillerite structure. Powder x-ray diffraction techniques and/or neutron diffraction can be employed, as known in the art, to detect the presence and degree of crystallinity and presence of a perovskite or brownmillerite phase in a given metal oxide material. Catalysts of this invention include metal oxides comprising a metal oxide phase of formulas I-IV above wherein the specified metal oxide phase represents about 50% of more by weight of the metal oxide. Catalysts of this invention include metal oxides comprising a metal oxide phase of formulas I-IV above wherein the specified metal oxide phase represents about 75% of more by weight of the metal oxide. Catalysts of this invention include metal oxides comprising a metal oxide phase of formulas I-IV above wherein the specified metal oxide phase represents 85% of more by weight of the metal oxide. Catalysts of this invention include metal oxides comprising a metal oxide phase of formulas I-IV above wherein the specified metal oxide phase represents 95% of more by weight of the metal oxide.

In specific embodiments, the unfinished F-T catalyst does not contain Ag. In other specific embodiments, the unfinished F-T catalyst is not a mixture of lanthanum oxide and barium oxide containing cobalt and ruthenium. In additional embodiments, the unfinished F-T catalyst is not one or more Group 8, 9 or 10 metals (IUPAC Periodic Table) impregnated in alumina. In yet other specific embodiments, the unfinished F-T catalyst is not supported on Ti-doped alumina. In another specific embodiment, the unfinished F-T catalyst is not a non-promoted cobalt catalyst. In yet another specific embodiment, the unfinished F-T catalyst does not contain palladium.

Catalyst formulations optionally include in addition to one or more catalysts of this invention other catalysts which are known in the art to exhibit catalytic activity for Fischer-Tropsch synthesis. The invention provides catalyst compositions which consist essentially of one or more of the catalysts of formulas I-IV wherein the variables of the formulas can be selected as described above. The invention provides catalyst compositions consisting of one or more of the catalysts of formulas I-IV wherein the variables of the formulas can be selected as described above. Catalyst formulations of this invention also include those that comprise one catalyst of any of formulas I, II, III or IV.

Catalysts of this invention can be employed in catalytic reactions in a variety of forms and configurations known in the art. For example, catalysts can be provided as a coating on or impregnated in support materials. Any known catalyst support material that does not detrimentally affect the desired catalytic reaction can be used. Preferred support materials do not themselves function as a catalyst under the conditions in which they will be employed in this invention to generate undesirable products. Support materials may, however, facilitate or enhance the activity or selectivity of the active catalyst of the invention. Support materials can include, among others alumina; silica; silica-alumina; ceria, titania, thoria, boria, zirconia, kieselguhr; magnesia or a mesoporous material, for example mesoporous alumina or silica. Supported or impregnated catalysts of this invention can generally comprise from about 1% to about 95% by weight of active catalyst. More typically supported catalysts of this invention comprise from about 5% to 35% by weight of active catalyst. More typically impregnated catalysts of this invention comprise from about 5% to 35% by weight of active catalyst.

In a specific embodiment, impregnated supported catalysts can be formed by incipient wetness impregnation in which the support is wetted with a solution containing a selected mixture of metal ion precursors (e.g., metal nitrates, metal sulfates, metal acetates, metal acetylacetonates, metal lactates, or mixtures thereof). The mixture of metal ion precursors is selected to achieve the desired metal composition and stoichiometry of the active catalyst.

Reduction of Mixed Metal Oxides:

Unfinished catalysts for F-T synthesis must be reduced prior to or during use in the reaction to activate the catalyst, i.e., render it into its usefully active form. This reduction step consists of exposure of the unfinished catalyst to a reducing gas. This reducing gas is generally comprised of hydrogen or a mixture of CO and hydrogen (syngas) in such concentration as to impart maximal activity, with minimal sintering to the catalyst. Conditions employed in this activation step depend on the catalyst being employed. For example, iron containing catalysts can be conveniently reduced in situ by exposure to reaction feed (syngas with $H_2$:CO of 0.3 to 3 or greater) or to pure or dilute hydrogen (diluted with a non-reactive gas, e.g., inert gas or nitrogen). Useful levels of hydrogen are from 5-100% at 150 to 300° C. at 150-500 psig and space velocity of 5-30 ml/min/g catalyst. Useful conditions for activation in reaction feed are a temperature of 170-350° C. with an $H_2$:CO ratio of 0.3 to 3 or greater and pressure of 150-500 psig. Exposure to reduction conditions may range from 2 to 72 hours. Preferred conditions for reduction of catalysts, particularly Fe-containing catalysts, of the subject invention are exposure to 100% hydrogen at 150 psig and 250° C. for 24-72 hours.

Cobalt catalysts are preferably reduced ex situ at temperatures between 250 and 600° C. in pure hydrogen or at hydrogen concentrations between 25 and 100% and at atmospheric pressure or pressures between 1 and 30 atmospheres. Preferred reduction conditions are exposure to 100% hydrogen gas at 350° C. for >12 hours. The catalyst must then be transferred to the FTS reactor with exclusion of air. An important consideration is the rate of temperature increase during catalyst reduction: A temperature ramp rate of 3° C./min or less is preferred to prevent the extremely exothermic reduction process from causing sintering of catalyst metals.

If it is desired to know the conditions for reduction prior to use, thermogravimetric analysis can be used to determine the weight loss of a catalyst sample upon exposure to reducing gas. The material in the oxidized form is weighed, heated in the presence of a reducing gas, and then reweighed following reduction. The ratio of the weight loss to initial weight is a measure of reducibility. The optimal reduction temperature can be determined from the observed weight loss as a function of temperature.

Catalytic metals used in the F-T synthesis are usually active for hydrocarbon synthesis in the zero-valent metallic state. Reduced catalytic metals are highly susceptible to oxidation by any number of oxidizing agents, particularly by molecular oxygen in air. Oxidation of the reduced catalytic metals to an oxidized state decreases the catalyst activity. It is beneficial to protect reduced catalyst from any oxidation, such as by oxygen from air. Because of the sensitivity of activated catalysts to oxidation in situ reduction/activation of catalysts is preferred. However, methods are known in the art for catalysts reduction/activation external to the reactor. For example, reduced catalysts can be embedded in a coating material, for example a wax or oil, to provide a barriers to oxidation.

Granule Size for Catalysts of the Present Invention:

Catalyst particle size can significantly affect performance of catalysts of the present invention. Particle size partially determines catalyst surface area and also influences mass transport in pores. Generally, smaller particle size favors higher performance of the catalyst because of the higher surface area and reduced mass transport resistance. However, in F-T slurry reactors, a lower limit on particle size is necessary, as smaller particles tend to clog filters designed to separate catalyst from the slurry medium. Catalyst particle size of between less than 1 μm and up to 1000 μm may be used, but the preferred particle size range for catalysts of the present invention is between 20 and 150 μm.

When a group of metals or metal ions is disclosed herein, it is understood that all individual members of that group and all subgroups of the group members, are disclosed separately. In general, when a Markush group or other grouping is used herein, all individual members of the group and all combinations and subcombinations possible of the group are intended to be individually included in the disclosure. Additionally, unless otherwise specified, all isotopic variants of compounds disclosed herein are intended to be encompassed by the disclosure. Every formulation or combination of components described or exemplified herein can be used to practice the invention, unless otherwise stated.

Whenever a range is given in the specification, for example, a temperature range, a time range, or a composition or concentration range, the range given is intended to be inclusive of the endpoints given, and all intermediate ranges and subranges, as well as all individual values included in the ranges given are intended to be included in the disclosure.

The specification contains specific examples for the preparation of mixed metal compounds. Those of ordinary skill in the art will appreciate that other methods for the preparation of these materials are known in the art. As indicated herein the method of preparation of the catalyst may affect catalyst performance.

It is understood in the art that starting material for the preparation of the mixed metal oxide species of this invention may contain minor impurities which contain metals or metal ions in addition to those listed in the formulas herein. It will be appreciated that such minor impurities are encompassed within the formulas disclosed herein to the extent that the impurities do not substantially detrimentally affect the properties of the materials herein for uses described herein.

All patents and publications mentioned in the specification are indicative of the levels of skill of those skilled in the art to which the invention pertains. References cited herein are incorporated by reference herein in their entirety to indicate the state of the art as of their filing date and it is intended that this information can be employed herein, if needed, to exclude specific embodiments that are in the prior art. For example, when a compound is claimed, it should be understood that compounds known and available in the art prior to Applicant's invention, including compounds for which an enabling disclosure is provided in the references cited herein, are not intended to be included in the composition of matter claims herein.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. In each instance herein any of the terms "comprising", "consisting essentially of" and "consisting of" may be replaced with either of the other two terms. The invention illustratively described herein suitably may be practiced in the absence of any element or elements, limitation or limitations which is not specifically disclosed herein.

One of ordinary skill in the art will appreciate that starting materials, reagents, solid substrates, synthetic methods, purification methods, and analytical methods other than those specifically exemplified can be employed in the practice of the invention without resort to undue experimentation. All art-known functional equivalents, of any such materials and methods are intended to be included in this invention. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

All references cited herein are hereby incorporated by reference to the extent that there is no inconsistency with the disclosure of this specification. Some references provided herein are incorporated by reference to provide details concerning sources of starting materials, additional starting materials, additional reagents, additional methods of synthesis, additional methods of analysis and additional uses of the invention.

THE EXAMPLES

Example 1

Preparation of $Sr_{1.4}La_{0.6}Fe_{1.0}Ga_{0.4}Cu_{0.6}O_{5-\delta}$:

Using the ceramic method: 23.34 g of strontium carbonate, 11.98 g of lanthanum oxide, 9.79 g of iron (III) oxide, 4.96 g of gallium oxide, and 5.85 g of copper (II) oxide were combined, added to a plastic bottle along with an isopropanol carrier and zirconia grinding media and ball milled for about 2 days. The mixture was calcined at 1000° C. for 8 hours. The resulting powder (53.8 g) was ground and sieved to 100 mesh.

Powder x-ray diffraction showed that a single, perovskite-type phase was present In preparations by the ceramic method, the detection limit for an additional phase is of the order of 2-3% of the first or major phase present. The surface area of the material was determined using physisorption of nitrogen and the Brunauer, Emmett, and Teller equation for the isotherm and found to be 0.7 $m^2/g$.

Assessment of Catalyst Activity

The activity of the catalyst $Sr_{1.4}La_{0.6}Fe_{1.0}Ga_{0.4}Cu_{0.6}O_{5-\delta}$ was measured in a slurry phase reactor in which catalyst is suspended in a high boiling hydrocarbon oil (Durasyn 164, BP). The reactor consisted of a 1 L 316 stainless steel reactor incorporating a CF flange and copper seal. The reactor employed a small paddle stirrer with a packed gland stirring mechanism. A catalyst weight loading (100× (weight catalyst)/(weight slurry+weight catalyst)) of 5% was employed. The catalyst was reduced prior to reaction by heating at 280° C. under hydrogen (150 psig) delivered at a space velocity of 24 mL/min-$g_{catalyst}$. Immediately following catalyst reduction, Fischer-Tropsch synthesis was carried out using the catalyst as follows. The reactor was cooled to 250° C. and a gas mixture composed of 50% by volume carbon monoxide and 50% by volume hydrogen was introduced into the reactor at a pressure of 250 psig and a space velocity of 18 mL/min-$g_{catalyst}$. The data obtained on six samples of the same catalyst are presented in Table 1. These data show very little formation of carbon dioxide.

Example 2

Preparation of $Sr_{1.4}La_{0.6}Fe_{1.0}Al_{0.4}Cu_{0.6}O_{5-\delta}$:

Using the ceramic method: 28.47 g of strontium carbonate, 13.47 g of lanthanum oxide, 11.00 g of iron (III) oxide, 2.81 g of aluminum oxide, and 6.57 g of copper (II) oxide were combined and added to a 25mL screw cap plastic bottle along with an isopropanol carrier and 5 cylindrical toughened-zirconia grinding media. The solvent was evaporated from this mixture, which was then heated to 90° C. for 8 hours. The resulting powder was placed in an alumina crucible, brought to 1000° C. at 3° C./min and calcined at this temperature for 8 hours. The calcined material (53.8 g) was crushed and sieved to 100 mesh through a wire screen.

Example 3

Co-precipitated X40-13-$Sr_{0.31}La_{0.78}K_{0.08}Fe_{1.88}Al_{0.81}Cu_{0.14}O_{5.70}$.

A solution was prepared by dissolving 37.91 g of $Sr(NO_3)_2$ and 32.813 g of $La(NO_3)_3 \cdot 5.69H_2O$ in 250 mL of water. A 45% KOH solution (52.9 mL) was added dropwise to this solution with stirring. The mixture was allowed to stir overnight. A separate solution was prepared by dissolving 51.692 g of $Fe(NO_3)_3 \cdot 9H_2O$, 19.197 g of $Al(NO_3)_3 \cdot 9H_2O$, and 12.860 g of $Cu(NO_3)_2 \cdot 2.5H_2O$ in 250 mL of water. A 45% KOH (55 mL) solution was added dropwise and the resulting mixture stirred overnight. The two precipitates were separately washed with water and suction filtered. The precipitated solids were then combined, 850 ml of water was added and the mixture stirred for about 75 minutes. The mixture was filtered and the combined precipitates were air dried overnight. The dried solids were further dried by exposure to a heat lamp. The dried solid was ground with a mortar and pestle to less than 150 μm and then calcined at 450° C. for 8 hours. The resulting powder was then sieved to ≦150 μm. The yield was 35.6 g. Powder x-ray diffractometry gave a pattern that was characteristic of non-crystalline or small crystallize size solids. Energy dispersive x-ray spectroscopy (EDX) gave the following formula for the material: $Sr_{0.31}La_{0.78}K_{0.08}Fe_{1.88}Al_{0.81}Cu_{0.14}O_{5.70}$. Nitrogen physisorption measurements and the Brunauer-Emmett-Teller (BET) model for multilayer adsorption gave a specific surface area of 39.86 $m^2/g$. Nitrogen physisorption

TABLE 1

| Sample # | CO Conv.(%) | $CO_2$ Yield (%) | CO(%) | $CO_2$ (%) | $CH_4$ (%) | $C_2H_6$ (%) | $C_2H_4$ (%) |
|---|---|---|---|---|---|---|---|
| 1 | 20.54 | 6.17 | 40.09 | 1.27 | 5.54 | 0.68 | 0.07 |
| 2 | 17.72 | 5.00 | 41.51 | 0.89 | 4.19 | 0.35 | 0.08 |
| 3 | 17.70 | 4.92 | 41.52 | 0.87 | 4.18 | 0.35 | 0.07 |
| 4 | 21.98 | 2.91 | 39.36 | .064 | 4.82 | 0.41 | 0.08 |
| 5 | 20.11 | 3.24 | 40.30 | 0.65 | 4.93 | 0.43 | 0.08 |
| 6 | 20.55 | 2.98 | 40.08 | 0.61 | 4.84 | 0.44 | 0.08 |
| 7 | 19.69 | 3.30 | 40.51 | 0.65 | 5.19 | 0.47 | 0.08 |
| Ave. | 19.76 | 4.07 | 40.48 | 0.80 | 4.81 | 0.45 | 0.08 | isotherms, along with the Barrett-Joyner-Halenda (BJH) model was used to determine the pore size distribution (PSD) and total pore volume. The PSD was found to give maxima at 55 and 150 Å. The total pore volume obtained was 0.17 $cm^3/g$.

Example 4

Preparation of X40-08A 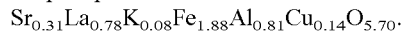 $Sr_{0.39}La_{0.98}K_{0.02}Fe_{1.78}Al_{0.20}Cu_{0.64}O_{5.48}$ by the Glycine-Nitrate Combustion Method.

A solution was prepared by dissolving 6.09 g of $Sr(NO_3)_2$, 31.17 g of $La(NO_3)_3 \cdot 5.69H_2O$, 11.09 g of $Cu(NO_3)_2 \cdot 2.5H_2O$, 53.31 g of $Fe(NO_3)_3 \cdot 9H_2O$, 0.14 g of $KNO_3$, and 5.51 g of $Al(NO_3)_3 \cdot 9H_2O$ in 300 mL $H_2O$ along with 61.05 g of glycine and 16.27 g of $NH_4NO_3$. This solution was placed in a 4 L stainless steel beaker and a funnel shrouded at the mouth by a wire screen placed into the beaker. Air was delivered to the mixture via the funnel neck using an air pump. The beaker was heated using a hot plate and the solvent driven off, resulting in a thickened mixture which eventually ignited, producing flames, an ash, and a fine dust. The ash and any powdered remnant of it were attrition ground for 16 hours at 400 rpm using a planetary attrition mill. The resulting powder was sieved through a 100 mesh screen.

Example 5

Preparation of X40-08B $Sr_{0.39}La_{0.98}K_{0.02}Fe_{1.78}Al_{0.20}Cu_{0.64}O_{5.48}$ Supported on Alumina A solution containing 1.52 g of $Sr(NO_3)_2$, 7.80 g of $La(NO_3)_3 \cdot 5.69H_2O$, 2.78 g of $Cu(NO_3)_2 \cdot 2.5H_2O$, 13.34 g of $Fe(NO_3)_3 \cdot 9H_2O$, 0.04 g of $KNO_3$, and 1.38 g of $Al(NO_3)_3 \cdot 9H_2O$ in 30 mL water was prepared. Alumina powder (50 g) was added to this solution, with thorough mixing. The solvent was removed from the resulting slurry by rotary evaporation for 30 minutes, followed by application of vacuum and heating to 85° C. for 2 hours until the solid was dry. The powder was placed in an alumina crucible and dried at 100° C. for 3 hours followed by calcinations at 650° C. for 8 hours. The calcined solid was then loaded a second time by the same procedure as above, with the exception that the solid exposed to fresh solution was dried at 120° C. for 2 hours. The final product, after calcinations at 650° C. for 8 hours again, was sieved to ≦150 μm.

Example 6

Preparation of Co-precipitated Y4201-$Sr_{0.19}La_{0.68}Co_{2.87}Al_{0.27}O_{5.92}$.

A solution was prepared by dissolving 37.419 g of $Sr(NO_3)_2$ and 32.816 g of $La(NO_3)_3 \cdot 5.69H_2O$ in 250 mL of water. A 45% KOH solution (53.0 mL) was added dropwise to this solution with stirring. The mixture was allowed to stir overnight. A separate solution was prepared by dissolving 58.811 g of $Co(NO_3)_2 \cdot 6H_2O$ and 18.951 g of $Al(NO_3)_3 \cdot 9H_2O$ in 250 mL of water. A 45% KOH (55 mL) solution was added dropwise until a pH of 7.7 was obtained and the resulting mixture stirred overnight. The two precipitates were separately washed with water and suction filtered. The precipitated solids were then combined, 850 ml of water was added and the mixture stirred for about 75 minutes. The mixture was filtered, washed with water, and the combined precipitates were air dried overnight. These solids were further dried by heating at 115° C. for 4 hours. The dried solid was ground with a mortar and pestle to less than 150 μm and then calcined at 450° C. for 8 hours. The resulting powder was then sieved to ≦150 μm. The Powder x-ray diffractometry gave a pattern that was characteristic of non-crystalline or small crystallize size solids. Energy dispersive x-ray spectroscopy (EDX) gave the following formula for the material:

$Sr_{0.19}La_{0.68}Co_{2.87}Al_{0.27}O_{5.92}$. Nitrogen physisorption measurements and the Brunauer-Emmett-Teller (BET) model for multilayer adsorption gave a specific surface area of 54.75 m$^2$/g. Nitrogen physisorption isotherms, along with the Barrett-Joyner-Halenda (BJH) model was used to determine the pore size distribution (PSD) and total pore volume. The PSD was found to give maxima at 130 Å. The total pore volume obtained was 0.376 cm$^3$/g.

Example 7

Preparation of Co-Precipitated X40-11 $Sr_{0.63}La_{0.85}Fe_{1.58}Al_{0.54}Cu_{0.41}O_{5.50}$.

A solution was prepared by dissolving 11.37 g of $Sr(NO_3)_2$ and 9.844 g of $La(NO_3)_3 \cdot 5.69H_2O$ in 77 mL of water. A 45% KOH solution (16 mL) was added dropwise to this solution with stirring. The mixture was allowed to stir overnight. A separate solution was prepared by dissolving 15.51 g of $Fe(NO_3)_3 \cdot 9H_2O$, 5.759 g of $Al(NO_3)_3 \cdot 9H_2O$, and 5.355 g of $Cu(NO_3)_2 \cdot 2.5H_2O$ in 77 mL of water. A 45% KOH (16.5 mL) solution was added dropwise until a pH of 7.7 was obtained and the resulting mixture stirred overnight. The two precipitates were separately washed with water and suction filtered. The precipitated solids were then combined, 220 ml of water was added and the mixture stirred for about 75 minutes. The mixture was filtered and the combined precipitates were air dried overnight. The dried solids were further dried by exposure to a heat lamp for 3 hours. The dried solid was then forced through a 100 mesh sieve and then calcined at 450° C. for 8 hours. The resulting powder was then sieved to ≦100 mesh. The yield was 9.16 g. Powder x-ray diffractometry gave a pattern that was characteristic of non-crystalline or small crystallize size solids. Energy dispersive x-ray spectroscopy (EDX) gave the following formula for the material: $Sr_{0.63}La_{0.85}Fe_{1.58}Al_{0.54}Cu_{0.41}O_{5.50}$. Nitrogen physisorption measurements and the Brunauer-Emmett-Teller (BET) model for multilayer adsorption gave a specific surface area of 78.77 m$^2$/g. Nitrogen physisorption isotherms, along with the Barrett-Joyner-Halenda (BJH) model was used to determine the pore size distribution (PSD) and total pore volume. The PSD was found to give a maxima at 56 Å. The total pore volume obtained was 0.194 cm$^3$/g.

Example 8

Preparation of Coprecipitated X40-08 $Sr_{0.39}La_{0.98}K_{0.02}Fe_{1.78}Al_{0.20}Cu_{0.64}O_{5.48}$.

A solution was prepared by dissolving 11.375 g of $Sr(NO_3)_2$ in 77 ml of water. A 45% KOH solution (16 mL) was added dropwise to this solution with stirring. The mixture was allowed to stir overnight. A separate solution was prepared by dissolving 15.508 g of $Fe(NO_3)_3 \cdot 9H_2O$, 5.762 g of $Al(NO_3)_3 \cdot 9H_2O$, 9.842 g of $La(NO_3)_3 \cdot 5.69H_2O$, and 5.358 g of $Cu(NO_3)_2 \cdot 2.5H_2O$ in 77 mL of water. A 45% KOH (17.5 mL) solution was added dropwise until a pH of 7.7 was obtained and the resulting mixture stirred overnight. The two precipitates were separately washed with water and suction filtered. The precipitated solids were then combined, 220 ml of water was added and the mixture stirred for about 75 minutes. The mixture was filtered and the combined precipitates were dried by exposure to a heat lamp for 3 hours. The dried solid was then forced through a 100 mesh sieve and then calcined at 450° C. for 8 hours. The resulting powder was then sieved to ≦100 mesh. The yield was 10.46 g. Powder x-ray diffractometry gave a pattern that was characteristic of non-crystalline or small crystallize size solids. Energy dispersive x-ray spectroscopy (EDX) gave the following formula for the material: $Sr_{0.39}La_{0.98}K_{0.02}Fe_{1.78}Al_{0.20}Cu_{0.64}O_{5.48}$. Nitrogen physisorption measurements and the Brunauer-Emmett-Teller (BET) model for multilayer adsorption gave a specific surface area of 69.54 m$^2$/g. Nitrogen physisorption isotherms, along with the Barrett-Joyner-Halenda (BJH) model was used to determine the pore size distribution (PSD) and total pore volume. The PSD was found to give a maxima at 43 Å. The total pore volume obtained was 0.186 cm$^3$/g.

Example 9

Preparation of Coprecipitated X40-24 $Sr_{0.51}La_{0.73}K_{0.20}Fe_{1.72}Al_{0.19}Cu_{0.65}O_{5.22}$.

A solution was prepared by dissolving 75.819 g of $Sr(NO_3)_2$ and 66.850 g of $La(NO_3)_3 \cdot 5.69H_2O$ in 500 mL of water. A 45% KOH solution (106 mL) was added dropwise to this solution with stirring. The mixture was allowed to stir overnight. A separate solution was prepared by dissolving 103.384 g of $Fe(NO_3)_3 \cdot 9H_2O$, 38.399 g of $Al(NO_3)_3 \cdot 9H_2O$, and 35.712 g of $Cu(NO_3)_2 \cdot 2.5H_2O$ in 77 mL of water. A 45% KOH (110 mL) solution was added dropwise until a pH of 7.5 was obtained and the resulting mixture stirred overnight. The two precipitates were separately washed with water and suction filtered. The precipitated solids were then combined, 1700 ml of water was added and the mixture stirred for about 75 minutes. The mixture was filtered and the combined precipitates were air dried overnight. The dried solids were further dried by exposure to a heat lamp for ~8 hours. The dried solid was then forced through a 60 mesh sieve and then calcined at 450° C. for 8 hours. The resulting powder was then sieved to 60-325 mesh. The yield was 81.74 g. Three additional batches of the material were prepared in an identical fashion and the four batches of material combined by ball milling for 15.5 hours in a plastic bottle. The overall yield was 321.92 g. Powder x-ray diffractometry gave a pattern that was characteristic of non-crystalline or small crystallize size solids. Energy dispersive x-ray spectroscopy (EDX) gave the following formula for the material: $Sr_{0.51}La_{0.73}K_{0.20}Fe_{1.72}Al_{0.19}Cu_{0.65}O_{5.22}$. Nitrogen physisorption measurements and the Brunauer-Emmett-Teller (BET) model for multilayer adsorption gave a specific surface area of 27.73 m$^2$/g. Nitrogen physisorption isotherms, along with the Barrett-Joyner-Halenda (BJH) model was used to determine the pore size distribution (PSD) and total pore volume. The PSD was found to give a maxima at 50 and 270 Å. The total pore volume obtained was 0.180 cm$^3$/g.

Example 10

Assessment of FTS Catalytic Activity of X40-08, X40-11, and X40-13:

The activities of the catalysts X40-08, X40-11, and X40-13 was measured in a slurry phase reactor in which catalyst is suspended in a high boiling hydrocarbon oil (Durasyn 164, BP). The reactor consisted of a 300 mL stainless steel reaction bomb. The reactor employed a small paddle stirrer with a packed gland stirring mechanism. A catalyst weight loading (100× (weight catalyst)/(weight slurry+weight catalyst) of 5% was employed. The catalyst was reduced prior to reaction by heating at 280° C. under hydrogen (150 psig) delivered at a flow rate of 24 mL/min-$g_{catalyst}$. Immediately following catalyst reduction, Fischer-Tropsch synthesis was carried out using the catalyst as follows. The reactor was cooled to 250° C. and a gas mixture composed of 40% by volume carbon monoxide and 60% by volume hydrogen was introduced into the reactor at a pressure of 250 psig and a flow rate of 18 mL/min-$g_{catalyst}$. The data obtained are presented in Table 2. These data show less formation of carbon dioxide than a baseline precipitated iron catalyst, even when conversion is comparable.

TABLE 2

| Catalyst | Time (days) | % CO Conv. | % Sel. $CO_2$ | % Sel. $CH_4$ |
|---|---|---|---|---|
| X40-08 | 3.2 | 66.6 | 40.0 | 7.4 |
| X40-08A | 3.2 | 33.7 | 33.8 | 6.7 |
| X40-08B | 3.2 | 22.4 | 31.2 | 10.7 |
| X40-11 | 2 | 66.5 | 34.8 | 8.7 |
| X40-13 | 5.1 | 80.7 | 33.8 | 5.0 |
| 100Fe/7Cu/2.6K/9.2$SiO_2$ (baseline) | 3.2 | 90.0 | 48.5 | 3.6 |
| 30% Co/$Al_2O_3$ (baseline) | 3.0 | 66.7 | 9.5 | 4.7 |

Table 2 also provides a comparison of $Sr_{0.39}La_{0.98}K_{0.02}Fe_{1.78}Al_{0.20}Cu_{0.64}O_{5.48}$ catalyst activity as a function of its preparation (X40-08 (coprecipitated) or X40-08A (glycine-nitrate combustion) or whether or not the catalyst is supported (X40-08B). In general, coprecipitation gives better catalyst characteristics for F-T synthesis, than the glycine-nitrate method.

An average alpha of 0.78 was determined for the X40-13 catalyst for carbon numbers between 6 and 24. In comparison, the average alpha determined for the baseline precipitated iron catalyst above was 0.70 and the average alpha determined for the baseline alumina supported cobalt catalyst was 0.75.

Assessment of FTS Catalytic Activity of X40-24 and Y4201:

The activities of the catalysts X40-24 and Y4201 were measured as above in a slurry phase reactor in which catalyst is suspended in a high boiling hydrocarbon oil (Durasyn 164, BP). The reactor consisted of a 300 mL stainless steel reaction bomb. The reactor employed a small paddle stirrer with a packed gland stirring mechanism. A catalyst weight loading (100× (weight catalyst)/(weight slurry+weight catalyst)) of 5% was employed. The catalyst was reduced prior to reaction by heating at 280° C. under hydrogen (150 psig) delivered at a space velocity of 24 mL/min-$g_{catalyst}$. Immediately following catalyst reduction, Fischer-Tropsch synthesis was carried out using the catalyst as follows. The reactor was cooled to 230° C. and a gas mixture composed of 17% by volume carbon monoxide, 33% by volume hydrogen, 2.5% by volume carbon dioxide, and 47.5% by volume nitrogen was introduced into the reactor at a pressure of 400 psig and a space velocity of 18 mL/min-$g_{catalyst}$. The data obtained are presented in Table 3. These data show less formation, and even net removal, of carbon dioxide compared to a baseline precipitated iron catalyst, even when CO conversion is comparable.

TABLE 3

| Catalyst | Catalyst wt % | Day on Line | Rx T | Space velocity (mL/m)/g | Feed $H_2$/CO | CO Conv % | $CO_2$ Sel % |
|---|---|---|---|---|---|---|---|
| X4024 | 5.04 | 1.42 | 230 | 17.7 | 2.2 | 80.6 | −12.7 |
|  |  | 1.5 | 230 | 17.9 | 2.0 | 81.4 | −9.8 |
|  |  | 1.698 | 230 | 17.8 | 1.9 | 82.5 | −5.9 |
|  |  | 2.4 | 230 | 17.6 | 2.1 | 82.8 | −8.8 |
|  |  | 2.66 | 230 | 17.8 | 2.1 | 85.4 | −8.1 |
| Y4201 | 4.62 | 0.2 | 230 | 18.4 | 2.0 | 33.4 | 4.2 |
|  |  | 0.89 | 230 | 18.2 | 2.0 | 77.2 | 11.3 |

TABLE 3-continued

| Catalyst | Catalyst wt % | Day on Line | Rx T | Space velocity (mL/m)/g | Feed $H_2$/CO | CO Conv % | $CO_2$ Sel % |
|---|---|---|---|---|---|---|---|
|  |  | 1.16 | 230 | 18.4 | 1.4 | 30.0 | 6.7 |
|  |  | 1.89 | 230 | 9.0 | 2.1 | 100.0 | 20.4 |
|  |  | 2.18 | 230 | 9.0 | 2.2 | 100.0 | 21.7 |
|  |  | 2.88 | 230 | 8.8 | 2.3 | 100.0 | 23.4 |
|  |  | 3.17 | 250 | 18.0 | 2.1 | 100.0 | 27.2 |
|  |  | 3.88 | 250 | 18.4 | 2.0 | 100.0 | 25.8 |

We claim:

1. A process for the production of hydrocarbons comprising the steps:
   (a) introducing a feed gas stream comprising hydrogen, carbon monoxide, and carbon dioxide into a Fischer Tropsch reactor;
   (b) reacting said feed gas in the reactor employing a mixed metal oxide catalyst where the reactor is operated at a pressure from 100 psig to 1200 psig and a temperature between 175° C. to 350° C. wherein the CO conversion is greater than 20 mole %; and
   (c) collecting product from said reactor where the product comprises hydrocarbon and water wherein the total mass flow rate of $CO_2$ out of the reactor is less than or equal to the amount of $CO_2$ in the feed gas stream wherein the mixed metal oxide catalyst is a catalyst having the formula:

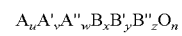
   $A_u A'_v A''_w B_x B'_y B''_z O_n$ wherein u+v+w+x+y+z=a whole number and n is a number that makes the compound charge neutral;
   A=$Ca^{2+}$, $Mg^{2+}$, $Sr^{2+}$, $Ba^{2+}$ or mixtures thereof;
   A'=$Y^{3+}$, $La^{3+}$, any lanthanide metal 3+ ion, or mixtures thereof;
   A''=$Li^+$, $Na^+$, $K^+$, or $CS^+$;
   B=Fe, Co, Ni, or Ru ion or a mixture of these ions;
   B' is a Boron, Al, Ga, or In +3 ions or a mixture of these +3 ions;
   B'' is a $Cu^{2+}$ or $Zn^{2+}$ ion or a mixture of these 2+ ions;
   $0.01 \leq u \leq 1.99$;
   $0.01 \leq v \leq 1.99$;
   $0.0 \leq w \leq 0.1$;
   $0.01 \leq x \leq 3.0$;
   $0.01 \leq y \leq 1.99$ and
   $0.0 \leq z \leq 1.0$.

2. The method of claim 1 wherein the total mass flow rate of $CO_2$ out of the reactor is less than 90% of the $CO_2$ in the feed stream by mass.

3. The method of claim 1 wherein the total mass flow rate of $CO_2$ out of the reactor is less than the amount of $CO_2$ in the feed gas stream.

4. The method of claim 1 wherein the reactor space velocity ranges from 1-50 mL/g catalyst.

5. The method of claim 1 wherein the alpha value of the hydrocarbon products formed is greater than or equal to 0.65.

6. The method of claim 1 wherein the alpha value of the hydrocarbon products formed is greater than 0.75.

7. The method of claim 1 wherein the reactor is a slurry reactor and the catalyst is provided in a slurry at a concentration ranging from 1 wt % to about 10 wt %.

8. The method of claim 1 wherein the reactor is a fixed bed reactor.

9. The method of claim 1 wherein the CO conversion is greater than 50%.

10. The method of claim 1 wherein the catalyst particle size is between 20 μm and 150 μm.

11. The method of claim 1 wherein in the catalyst B=Fe, or Co ions or a mixture of these ions.

12. The method of claim 1 wherein in the catalyst z is greater than zero and B" is $Cu^{2+}$.

13. The method of claim 1 wherein the catalyst is prepared by coprecipitation.

14. The method of claim 1 wherein the catalyst has the formula:

$$Sr_uLa_vK_wFe_xAl_yCu_zO_{6-\delta}$$

wherein: u+v+w+x+y+z=4; 0.20≦u≦0.60; 0.60≦v≦1.00; 0.01≦w≦0.30; 1.5≦x≦2; 0.10≦y≦0.9 and 0.1≦z≦0.8.

15. The method of claim 1 wherein the catalyst has the formula:

$$Sr_uLa_vB_xAl_yCu_zO_{6-\delta}$$

wherein: u+v+x+y+z=4; B is Fe or Co ions or a mixture of these ions; 0.1≦u≦0.60; 0.60≦v≦1.00; 1.5≦x≦3; 0.10≦y≦0.9 and 0≦z≦0.8.

16. The method of claim 1 wherein the catalyst is $Sr_{0.51}La_{0.73}K_{0.20}Fe_{1.72}Al_{0.19}Cu_{0.65}O_{5.22}$.

17. The method of claim 15 wherein the catalyst is prepared by coprecipitation.

18. The method of claim 1 wherein the catalyst is selected from the group consisting of $Sr_{1.4}La_{0.6}Fe_{1.0}Ga_{0.4}Cu_{0.6}O_{5-\delta}$; $Sr_{1.4}La_{0.6}Fe_{1.0}Al_{0.4}Cu_{0.6}O_{5-\delta}$; $Sr_{0.31}La_{0.78}K_{0.08}Fe_{1.88}Al_{0.81}Cu_{0.14}O_{5.70}$; $Sr_{0.19}La_{0.68}Co_{2.87}Al_{0.27}O_{5.92}$; $Sr_{0.63}La_{0.85}Fe_{1.58}Al_{0.54}Cu_{0.41}O_{5.50}$; $Sr_{0.39}La_{0.98}K_{0.02}Fe_{1.78}Al_{0.20}Cu_{0.64}O_{5.48}$; and $Sr_{0.51}La_{0.73}K_{0.20}Fe_{1.72}Al_{0.19}Cu_{0.65}O_{5.22}$.

19. The method of claim 18 wherein the catalyst is prepared by coprecipitation.

20. A method for reductive oligomerization of carbon monoxide (CO) in the presence of molecular hydrogen (H2) which comprises the step of contacting a feed stream comprising CO and H2 with an activated reduced catalyst which is formed by reduction of an oxygen-deficient metal oxide having the formula:

$$A_uA'_vA''_wB_xB'_yB''_zO_n$$

wherein u+v+w+x+y+z=a whole number and n is a number that makes the compound charge neutral;

A=$Ca^{2+}$, $Mg^{2+}$, $Sr^{2+}$, $Ba^{2+}$ or mixtures thereof;

A'=$Y^{3+}$, $La^{3+}$, any lanthanide metal 3+ ion, or mixtures thereof;

A"=$Li^+$, $Na^+$, $K^+$, or $Cs^+$;

B=Fe, Co, Ni, or Ru ion or a mixture of these ions;

B' is a Boron, Al, Ga, or In +3 ions or a mixture of these +3 ions;

B" is a $Cu^{2+}$ or $Zn^{2+}$ ion or a mixture of these 2+ ions;

0.01≦u≦1.99;

0.01≦v≦1.99;

0.0≦w≦0.1;

0.01≦x≦3.0;

0.01≦y≦1.99 and 0.0≦z≦1.0.

21. The method of claim 20 wherein the product stream contains hydrocarbons the majority of which have 5 or more carbon atoms.

22. The method of claim 20 which is conducted at a temperature less than about 300° C.

23. The method of claim 1 further comprising the step of activating the mixed metal oxide catalyst by reduction prior to reacting the feed gas with the catalyst.

* * * * *